Patented May 17, 1938

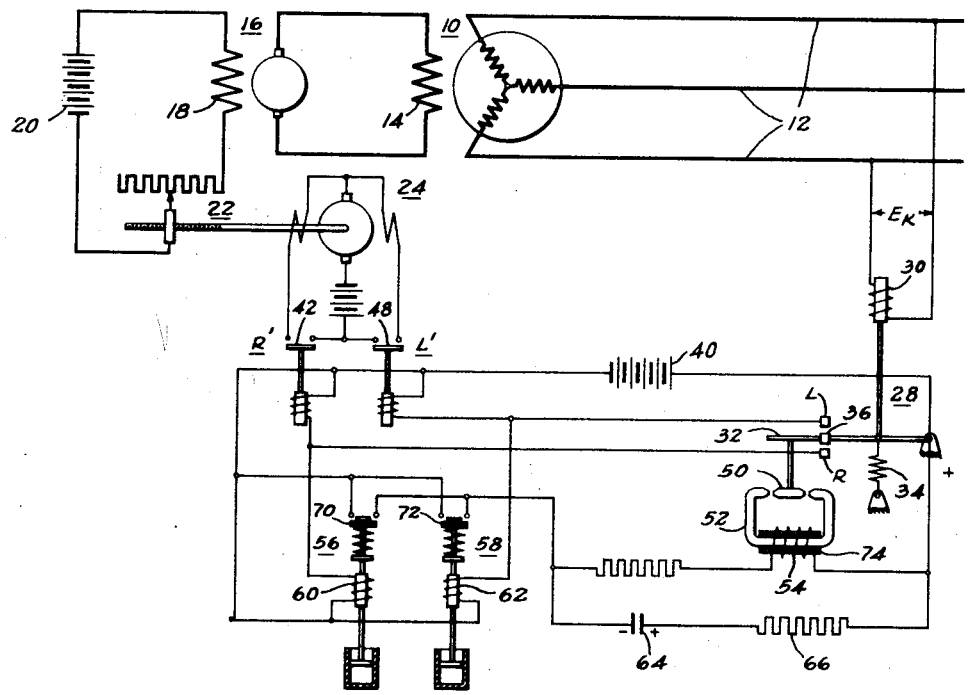

2,117,866

UNITED STATES PATENT OFFICE 2,117,866

REGULATING APPARATUS

Charles P. West, Edwin L. Harder, and Lawrence L. Fountain, Wilkinsburg, Pa., assignors to Westinghouse Electric & Manufacturing Company, East Pittsburgh, Pa., a corporation of Pennsylvania Application May 6, 1936, Serial No. 78,136

8 Claims. (Cl. 171—119)

This invention relates to electrical regulating systems and it has particular relation to improved means for preventing hunting in systems which utilize a quantity-responsive control element of the contact-making type.

Practically all regulators of this class which are capable of high sensitivity and rapid response require the use of some form of anti-hunting means to prevent overshooting of the corrective action, and it is to the provision of an improved form of such means that the present invention is directed.

Generally stated, the object of the invention is to provide a simplified form of anti-hunting means which does not detrimentally affect the sensitivity response, or other performance characteristics of the regulator to which it is applied.

Another object is to provide an anti-hunting device of the above character which utilizes magnetic means to effect the desired stabilizing of the regulatory actions.

A further object is to provide an anti-hunting scheme which in operation does not change the calibration of the contact-making control device to which it is applied.

In practicing our invention, we utilize magnetic means so arranged as to bias the movable arm of the contact making control device toward mid-position upon the occasion of each contact engagement. We find that this arrangement permits the resulting timing of the separation of the contact members to be so correlated with the constants of the regulating system that the desired stabilizing action is effected in a highly efficient manner.

Our invention, together with additional objects and advantages thereof, will best be understood through the following description of specific embodiments when taken in conjunction with the accompanying drawing, in which:

Figure 1 is a diagrammatic representation of apparatus and circuits showing our improved anti-hunting means applied to the contact-making control device of a rheostatic type of generator voltage regulator;

Fig. 2 is a similar representation of a modified form of the anti-hunting system shown in Fig. 1; and Fig. 3 is a diagram showing a still further simplified hookup.

Referring to the drawing, the regulating system depicted in Fig. 1 is adapted to maintain constant the voltage of an electrical generator 10, the armature windings of which are connected to the conductors 12 of an output circuit, and the field winding 14 of which is supplied with exciting current from a separate exciter 16. The field winding 18 of this exciter is in turn energized from a suitable source of unidirectional potential 20 through a circuit which includes a rheostat 22.

This rheostat is adapted to control the machine voltage $E_k$ by adjusting the machine exciting current, and is arranged to be operated by an electric motor 24, which is respectively controlled in its voltage-lowering and voltage-raising directions by a pair of relay devices L′ and R′. A contact making control device 28 selectively controls the actuation of these two relays in response to changes in the magnitude of the regulated voltage. As shown, this device comprises a solenoid 30 which is energized by a measure of the voltage $E_k$ to be regulated, and which exerts upon a contact carrying arm 32 an upwardly acting force which is opposed by the downwardly acting force of a tension spring 34.

When the regulated voltage is of the desired value, these forces balance each other, and the movable contact member 36 of the device occupies the neutral or mid-position shown. A decrease in voltage $E_k$ allows the contact member 36 to move downwardly into engagement with a cooperating member R to complete, from a suitable energizing source 40, a circuit which actuates relay R′ into its closed-contact position. In this position, a contact member 42 completes a circuit for driving rheostat operating motor 24 in the generator voltage-raising direction.

In a similar manner, when the voltage $E_k$ rises above the desired value, contact member 36 of the control device moves upwardly into engagement with a second cooperating member L to complete an actuating circuit for motor control relay L′. This relay completes, through its contact member 48, a circuit for energizing the motor 24 in its voltage-lowering direction and thus causes the voltage of generator 10 to be corrected back to the desired value.

The improved anti-hunting means of our invention will now be described as applied to the voltage regulating system just described. It is desired to point out that the improved anti-hunting means is not restricted in its application to the described regulating system, but is capable of application to many systems where a contact-making control device is utilized to maintain constant a quantity, such as temperature, pressure or the like, which is capable of adjustment. These means, however, are of particular applicability to voltage regulators for dynamo-electric generators in that they graduate the time delay between succeeding correcting changes in field excitation in inverse relation to the magnitude of the voltage error.

That is, when the error is large, the intervals between successive corrective impulses are small, and as the voltage approaches normal, these intervals progressively increase in order that each adjustment in excitation may have greater opportunity to take full effect before another one is instituted. As will be seen, this form of operation maintains the highest possible speed of response while preventing overshooting due to the electrical inertia of the controlled machine.

In the illustrated regulating system, this desired anti-hunting action is preferably achieved by mounting upon or supporting from the movable arm 32 of the control device 28 a segment 50 of magnetic material. Associated with this segment in some manner, such as shown, is a stationary yoke 52 of magnetic material which, upon the occasion of each contact engagement, is arranged to bias the segment 50 and the device arm 32 toward the neutral or mid-position illustrated.

In the arrangement shown in Fig. 1, the yoke 52 is provided with an energizing winding 54 through which source 40 circulates energizing current upon the actuation of either one of a pair of relays 56 and 58. These relays may be of any one of a number of well known types capable of quick-closing slow-opening performance.

As illustrated, the actuating winding 60 of relay 56 is energized by the engagement of contact members 36 and R of device 28, and the winding 62 of relay 58 is energized by the engagement of contacts 36 and L. Connected in parallel circuit relation with the winding 54 of the magnetic biasing means is a capacitor 64 and a dissipating resistor 66.

In operation of the described anti-hunting means, whenever the contact member 36 of the main control device 28 is brought into engagement with the contact member L or R, the one or the other of relays 56 and 58 completes, through its contact member 70 or 72, a circuit for energizing winding 54. The resulting circulation of magnetic flux through stationary yoke 52 exerts upon member 50 a force tending to bias movable contact member 36 of device 28 from engagement with the cooperating member. This separation in contact members interrupts the corrective action sufficiently in advance of the full attainment of quantity correction to prevent overshooting of the regulated quantity $E_k$. In case the first step of correction is not sufficient to restore the quantity, the above cycle repeats itself, at intervals of progressively increasing length, as many times as may be required.

For example, when in response to a drop in voltage $E_k$, device 28 causes contact member 36 to engage with member R, the resulting energization of winding 60 of relay 56 moves contact member 70 upwardly to complete the energizing circuit of the magnetic means winding 54. The flux which circulates through the yoke 52 and downwardly displaced segment 50 exerts an upwardly acting force upon this segment, thereby causing the described premature separation of contacts 36 and R and completing one cycle of voltage-raising corrective action.

A similar action takes place upon the engagement of device contact member 36 with member L, in which case the relay 58 functions to complete the energizing circuit for magnetic means winding 54. This causes the yoke 52 to bias upwardly displaced segment 50 in the downward direction, thereby prematurely separating contact members 36 and L of device 28 completing one cycle of voltage-lowering corrective action.

In order that such separation of the contact member 36 from the contact member L or R will not be followed by an immediate reengagement of the contact members, we provide means for maintaining flux in the core 52 for a short period following the deenergization of the relay 56 or 58. In the arrangement illustrated in Fig. 1, this result is accomplished by imparting to each of these relays a slow-releasing characteristic which prolongs the energization of winding 54. By virtue of it, the contact member (70 or 72) remains in engagement with the stationary contact studs for a short time following deenergization of the actuating winding (60 or 62).

For the purpose of graduating the time intervals between successive corrections inversely with the error in the regulated quantity, we also provide means whereby the energizing current through winding 54 is not interrupted suddenly, but is instead caused to die down gradually and to produce a progressive reduction in the intensity of mid-position biasing force exerted upon segment 50. In the system shown, these means take the form of the parallel connected capacitor 64, which becomes charged during the periods of winding energization. When the externally supplied energizing current is interrupted, this capacitor circulates its discharge currents through the winding 54 and thus produces the effect named.

To further assure gradual restoring force diminution, we surround the stationary magnetic yoke 52 with a sleeve 74 of low resistance conducting material in which changes in the intensity of yoke flux set up eddy currents which tend to counteract or prolong the flux during its dying down periods.

In the system of Fig. 1, the main contacts L and R of the control device 28 are utilized directly to supply actuating current to the time-delay release relays 56 and 58. In certain situations, it may be desirable to modify the arrangement to that shown in Fig. 2, in which the motor relays R' and L' are provided with auxiliary contact members 76 and 78 which perform this function. This arrangement permits use of only one slow-release control relay 56' in the energizing circuit of the magnetic means winding 54.

The operation of the arrangement of Fig. 2 is identical with that already explained in connection with Fig. 1, with the exception that actuating current for the relay 56' is supplied through a circuit which includes the named auxiliary contact members 76 and 78 instead of the members L and R of contact making control device 28.

In further instance it may be found possible to dispense entirely with the slow-releasing relay means and depend upon the other expedients, previously explained, to prevent the premature separation of the contact members of control device 28 from being followed by an immediate reengagement. In such situations, the simplified hook up of Fig. 3 will be found suitable. There the auxiliary contact members 76 and 78 of control relays R' and L' act directly in the control circuit of our magnetic anti-hunting means.

From the foregoing it will be apparent that our improved anti-hunting means in no way detract from the sensitivity of the regulator. The described arrangements, furthermore, are simple, do not change the regulator calibration and in many other respects are vastly superior to all comparable schemes known to the prior art.

Their effect is that on sufficiently large voltage errors the contacts of control device 28 remain closed continuously and the corrective adjustment of rheostat 22 is uninterrupted. As the error is reduced to a given lower value the antihunting means produce short spaced contact disengagements which cause the rheostat to be notched to its position of final adjustment. As before explained, the periods of these disengagements progressively increase as the voltage more closely approaches its desired or normal value.

Although we have shown and described certain specific embodiments of our invention, we are fully aware that many modifications thereof are possible. The invention, therefore, is not to be restricted except insofar as is necessitated by the prior art and by the scope of the appended claims.

We claim as our invention:

1. In a regulating system comprising quantity-adjusting means and a control-device therefor having a pair of cooperating contact members one of which is positionally responsive to the regulated quantity, the combination of electromagnetic means adapted, upon contact engagement, to produce, during the period of said engagement and for a predetermined short time after interruption thereof, a force tending to bias the movable contact member to a definite position away from the stationary one thereby to prevent overshooting of the quantity-correcting action.

2. In a regulating system comprising quantity-adjusting means and a control-device therefor having a pair of cooperating contact members one of which is positionally responsive to the regulated quantity, the combination of electromagnetic means adapted, upon contact engagement, to produce a force tending to bias the movable contact member to a definite position away from the stationary one and to continue this force with progressively diminishing intensity for a predetermined time after contact separation thereby to prevent overshooting of the quantity-correcting action.

3. In a regulating system comprising quantity-adjusting means and a control device therefor having an arm which is positionally responsive to the regulated quantity, a contact carried thereby, and a stationary contact adapted to be engaged by the movable contact when said quantity deviates, the combination of a segment of magnetic material carried by said movable arm, a stationary yoke associated therewith, and means for magnetizing said yoke during the engagement of said contacts thereby causing it to exert upon said segment a force tending to bias the movable contact away from the stationary one.

4. In a regulating system comprising quantity-adjusting means and a control device therefor having an arm which is positionally responsive to the regulated quantity, a contact carried thereby, and a stationary contact adapted to be engaged by the movable contact when said quantity deviates, the combination of a segment of magnetic material carried by said movable arm, a stationary yoke associated therewith, and means for magnetizing said yoke during contact engagement and for a short time thereafter thereby causing it to exert upon said segment a force tending to bias the movable contact away from the stationary one.

5. In a regulating system comprising quantity-adjusting means and a control device therefor having a pair of separated stationary contact members and a cooperating movable member adapted selectively to engage one or the other of the stationary members in response to deviations from the desired value in the regulated quantity, the combination of electromagnetic means adapted, upon contact engagement to produce a force tending to bias the movable member to a position midway between the said two stationary members thereby to prevent overshooting of the quantity-correcting action.

6. In a regulating system comprising quantity-adjusting means and a control device therefor having an arm which is positionally responsive to the regulated quantity, a contact carried thereby, and a pair of separated contacts adapted selectively to be engaged by said movable contact when said quantity deviates, the combination of a segment of magnetic material carried by said movable arm, a stationary yoke associated therewith, and means for magnetizing said yoke during contact engagement thereby causing it to exert upon said segment a force tending to bias the movable member to a position midway between said stationary members.

7. In a regulating system, in combination, quantity adjusting mechanism and control means therefor having a contact member movable in response to variations in a regulated quantity, and two fixed contact members adapted to be selectively engaged by said movable contact member, magnetic means for biasing said movable contact member to a position between said stationary contact members, and quick closing, time-delay opening, relay means responsive to engagement of said contact members for energizing said magnetic means.

8. In a regulating system, in combination, quantity adjusting mechanism and control means therefor having a contact member movable in response to variations in a regulated quantity, and two fixed contact members adapted to be selectively engaged by said movable contact member, magnetic means for biasing said movable contact member to a position between said stationary contact members, relay means for closing an energizing circuit for said magnetic means upon engagement of said movable contact member with one of the cooperating contact members and for interrupting said circuit at a predetermined time interval after separation of said contact members, and energy storing means for permitting a gradual deenergization only of said magnetic means.

CHARLES P. WEST.
EDWIN L. HARDER.
LAWRENCE L. FOUNTAIN.